(12) United States Patent
Oku

(10) Patent No.: US 8,493,608 B2
(45) Date of Patent: Jul. 23, 2013

(54) IMAGE FORMING APPARATUS CAPABLE OF MANAGING JOB HISTORY, COMPUTER-READABLE RECORDING MEDIUM STORING JOB HISTORY MANAGEMENT PROGRAM CODE, AND JOB HISTORY MANAGEMENT METHOD IN THE IMAGE FORMING APPARATUS

(75) Inventor: Toyoaki Oku, Osaka (JP)

(73) Assignee: KYOCERA Document Solutions Inc. (JP)

( * ) Notice: Subject to any disclaimer, the term of this patent is extended or adjusted under 35 U.S.C. 154(b) by 195 days.

(21) Appl. No.: 13/071,103

(22) Filed: Mar. 24, 2011

(65) Prior Publication Data

US 2011/0235124 A1  Sep. 29, 2011

(30) Foreign Application Priority Data

Mar. 25, 2010 (JP) ................................. 2010-069952
Mar. 25, 2010 (JP) ................................. 2010-069957

(51) Int. Cl.
*G06K 15/00* (2006.01)
(52) U.S. Cl.
USPC ....................................................... 358/1.16

(58) Field of Classification Search
None
See application file for complete search history.

(56) References Cited

U.S. PATENT DOCUMENTS

| 2003/0011800 | A1* | 1/2003 | Miyahara et al. | 358/1.13 |
|---|---|---|---|---|
| 2003/0011803 | A1* | 1/2003 | Peter et al. | 358/1.14 |
| 2003/0084020 | A1* | 5/2003 | Shu | 707/1 |
| 2009/0195819 | A1 | 8/2009 | Sugimoto et al. | |

FOREIGN PATENT DOCUMENTS

| JP | 02-280571 | 11/1990 |
|---|---|---|
| JP | 2002-014791 | 1/2002 |
| JP | 2006-155197 | 6/2006 |
| JP | 2009-188589 | 8/2009 |

* cited by examiner

*Primary Examiner* — Jeremiah Bryar
(74) *Attorney, Agent, or Firm* — McDonnell Boehnen Hulbert & Berghoff LLP

(57) ABSTRACT

An image forming apparatus includes a history storage unit, a history writing unit, and a history reading unit. The history storage unit is configured to store a job history that shows a history of a job. The history writing unit is configured to divide that job history into a plurality of histories, add identification information to the plurality of histories for associating the plurality of histories with each other, and write the plurality of histories to the history storage unit. The history reading unit is configured to read that plurality of histories on the basis of the identification information.

13 Claims, 10 Drawing Sheets

IMAGE FORMING APPARATUS CAPABLE OF MANAGING JOB HISTORY, COMPUTER-READABLE RECORDING MEDIUM STORING JOB HISTORY MANAGEMENT PROGRAM CODE, AND JOB HISTORY MANAGEMENT METHOD IN THE IMAGE FORMING APPARATUS

REFERENCE TO RELATED APPLICATIONS

This application is based upon and claims the benefit of priority from the corresponding Japanese Patent Application No. 2010-069952, filed in the Japan Patent Office on Mar. 25, 2010 and Japanese Patent Application 2010-069957 filed in the Japan Patent Office on Mar. 25, 2010, the entire contents of which is incorporated herein by reference.

BACKGROUND

1. Technical Field

The present disclosure relates to an image forming apparatus capable of managing a job history.

2. Description of the Related Art

A typical image forming apparatus stores a job history for each job for management or troubleshooting by an administrator. The job history includes information, such as a job receipt number, a job starting time, a job ending time, a job executor, and a job result.

To manage the job history, the image forming apparatus stores the job history in a nonvolatile memory. When a history check key is pressed, the image forming apparatus displays the job history on an operation display unit.

The image forming apparatus includes a plurality of pieces of information in the job history. The plurality of pieces of information includes not only information to be stored as the job occurs, but also information to be stored after the job occurs. Therefore, the image forming apparatus needs to reserve a storage area for the job history in advance. However, if the reserved storage area is too large, the storage area may be wasted.

It is thus desirable to provide an image forming apparatus that can reduce the storage capacity required for the job history.

SUMMARY

An image forming apparatus according to an embodiment of the present disclosure includes a history storage unit, a history writing unit, and a history reading unit. The history storage unit is configured to store a job history that shows a history of a job. The history writing unit is configured to divide that job history into a plurality of histories, add identification information to the plurality of histories for associating the plurality of histories with each other, and write the plurality of histories to the history storage unit. The history reading unit is configured to read that plurality of histories on the basis of the identification information.

A computer-readable recording medium according to an embodiment of the present disclosure stores job history management program code to be executed by a computer associated with an image forming apparatus. The job history management program code includes first sub program code and second sub program code. The first sub program code causes the computer to divide a job history for a job into a plurality of histories, add identification information to the plurality of histories for associating the plurality of histories with each other, and write the plurality of histories to a history storage unit. The second sub program code causes the computer to read that plurality of histories on the basis of the identification information.

A job history management method in an image forming apparatus according to an embodiment of the present disclosure includes (i) a history writing unit dividing a job history for a job into a plurality of histories, adding identification information to the plurality of histories for associating the plurality of histories with each other, writing the plurality of histories to a history storage unit, and (ii) a history reading unit reading that plurality of histories on the basis of the identification information.

Additional features and advantages are described herein, and will be apparent from the following Detailed Description and the figures.

DETAILED DESCRIPTION

A configuration of an image forming apparatus according to an embodiment of the present disclosure will be described.

Figure 1:
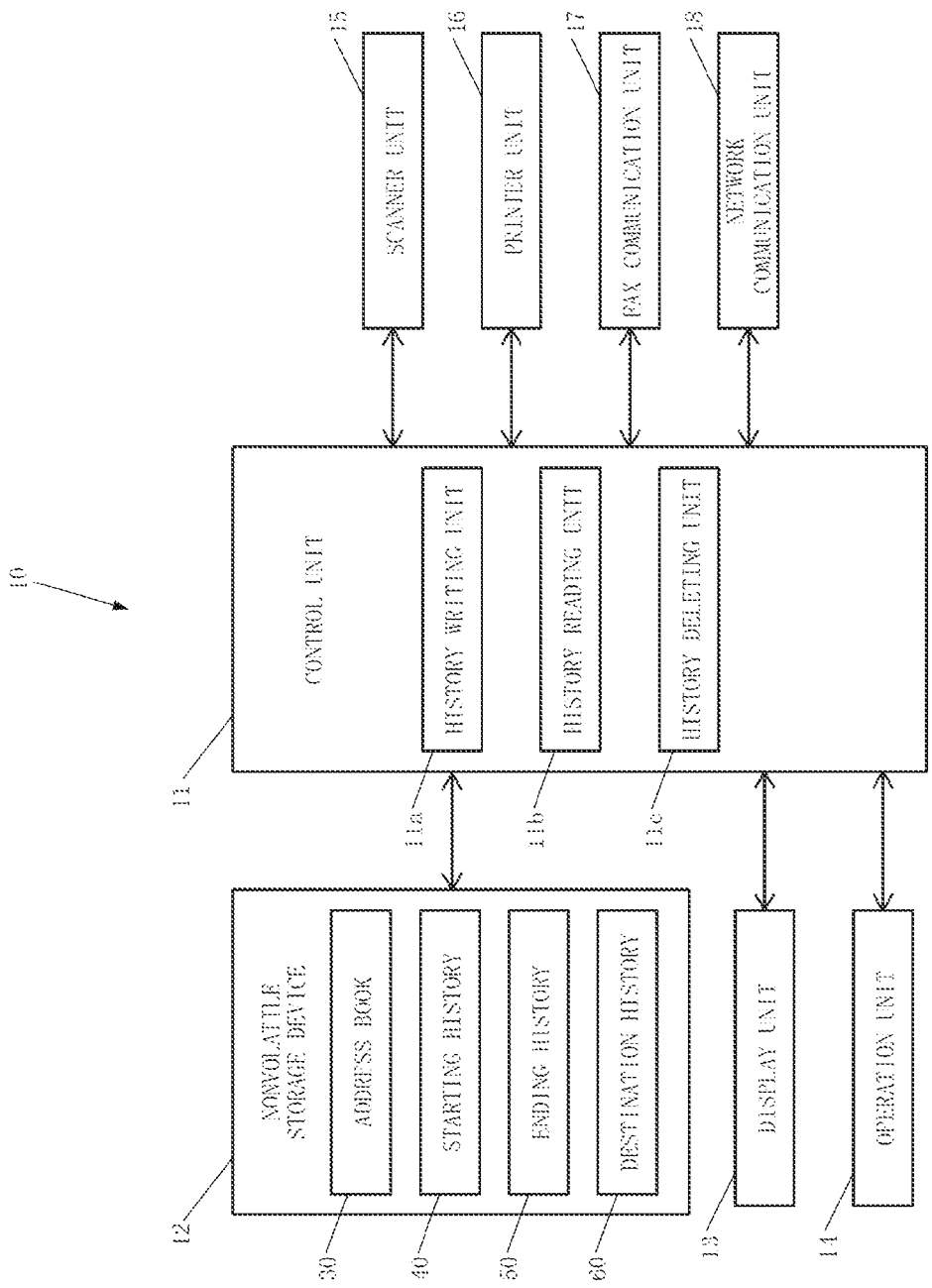
FIG. 1 shows a block diagram of an image forming apparatus according to an embodiment of the present disclosure.

FIG. 1 shows a block diagram of image forming apparatus 10 according to an embodiment of the present disclosure.

As illustrated in FIG. 1, image forming apparatus 10 includes control unit 11, nonvolatile storage device 12, display unit 13, operation unit 14, scanner unit 15, printer unit 16, fax communication unit 17, and network communication unit 18.

Figure 2:
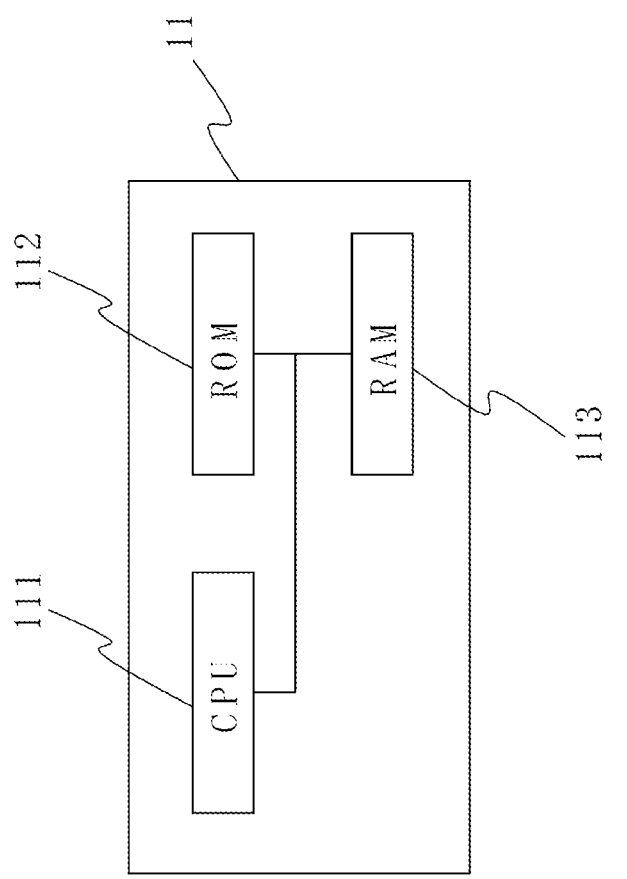
FIG. 2 shows an example hardware architecture of a control unit in the image forming apparatus.

Control unit 11 controls an operation of image forming apparatus 10. Control unit 11 has a hardware architecture illustrated in FIG. 2. As illustrated in FIG. 2, control unit 11 includes CPU (Central Processing Unit) 111, ROM (Read-Only Memory) 112 that stores a program and various types of data, and RAM (Random Access Memory) 113 that is used as a work area for CPU 111. CPU 111 is an arithmetic processing unit that operates control unit 11 by executing the program stored in ROM 112. RAM 113 temporarily stores the program and various types of data when the program is executed by CPU 111.

By executing the program, control unit 11 functions, as illustrated in FIG. 1, as history writing unit 11a, history reading unit 11b, and history deleting unit 11c. History writing unit 11a writes a job history to nonvolatile storage device 12. History reading unit 11b reads the job history from nonvolatile storage device 12. History deleting unit 11c deletes the job history from nonvolatile storage device 12.

Nonvolatile storage device 12 illustrated in FIG. 1 is, for example, an HDD (Hard Disk Drive), an EEPROM (Electrically Erasable Programmable ROM), or a flash memory. Nonvolatile storage device 12 stores various types of information.

Display unit 13 is a display device, such as an LCD (liquid crystal display). Display unit 13 displays various types of information.

Operation unit 14 is an input device, such as a set of buttons that form a touch panel together with display unit 13 or a set of buttons on an operation panel. Operation unit 14 receives various input operations from the user. Operation unit 14 and display unit 13 form the operation panel of image forming apparatus 10.

Scanner unit 15 is a reading device that reads a document and generates image data.

Printer unit 16 is a printing device that prints various jobs, such as jobs for image data generated by scanner unit 15, jobs for faxes received from an external facsimile apparatus via fax communication unit 17, and jobs for print data received from an external apparatus via network communication unit 18.

Fax communication unit 17 is a facsimile device that communicates with the external facsimile apparatus via a communication line, such as a dial-up line, by fax. Fax communication unit 17 transmits, by fax, image data generated by scanner unit 15 to the external facsimile apparatus. Also, fax communication unit 17 receives, by fax, image data to be printed on printer unit 16 from the external facsimile apparatus.

Network communication unit 18 is a communication device that communicates with the external apparatus, such as a PC (Personal Computer), via a network, such as a LAN (Local Area Network). Network communication unit 18 transmits image data generated by scanner unit 15 to the external apparatus. Also, network communication unit 18 receives image data to be printed on printer unit 16 from the external apparatus.

Nonvolatile storage device 12 stores address book 30, starting history 40, ending history 50, and destination history 60.

Address book 30 contains at least a destination used in a transmission job for transmitting image data to the destination by fax or e-mail (electronic mail). Address book 30 is stored in nonvolatile storage device 12. Various types of information contained in address book 30 can be, for example, selectively input to image forming apparatus 10 by the user from operation unit 14, or from the external apparatus via network communication unit 18. Therefore, the user does not have to type characters to input the destination from operation unit 14.

Starting history 40 is information written only at the start of a job. Ending history 50 is information written only at the end of the job. Destination history 60 is information written when the job is a transmission job. Starting history 40, ending history 50, and destination history 60 are written, for each job, to nonvolatile storage device 12. Destination history 60 is information written, for each destination, to nonvolatile storage device 12. Therefore, for example, in a multi-address transmission, hundreds of destination histories 60 may be stored for a single job in nonvolatile storage device 12.

Figure 3:
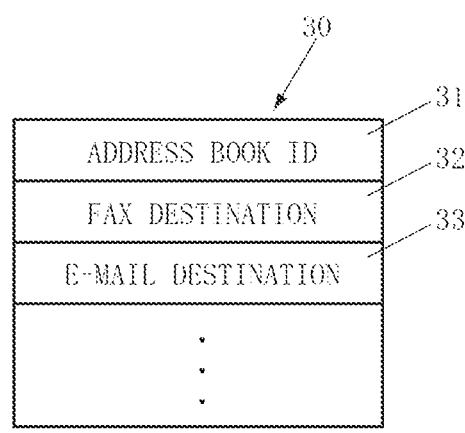
FIG. 3 shows information about one recipient in an address book registered in a nonvolatile storage device of the image forming apparatus.

FIG. 3 shows information about one recipient in address book 30 registered in nonvolatile storage device 12.

Address book 30 contains information about a plurality of recipients. As illustrated in FIG. 3, for each recipient, address book 30 contains address book ID 31 identifying the recipient, fax destination 32 associated with address book ID 31, and e-mail destination 33 associated with address book ID 31. Fax destination 32 includes a recipient's name and a fax number. E-mail destination 33 includes the recipient's name and an e-mail address. Address book 30 illustrated in FIG. 3 is merely an example. Address book 30 can contain not only fax destination 32 and e-mail destination 33, but also destinations for various other communication methods.

Figure 4A:
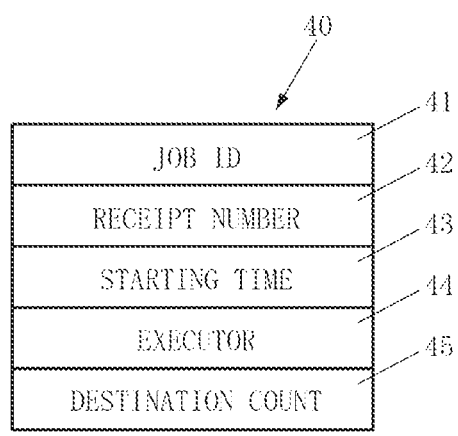
FIG. 4A shows a starting history stored in the nonvolatile storage device of the image forming apparatus.
Figure 4B:
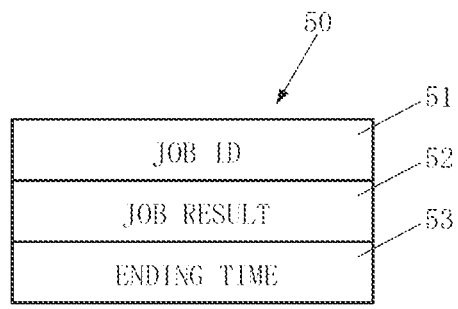
FIG. 4B shows an ending history stored in the nonvolatile storage device of the image forming apparatus.

FIG. 4A shows starting history 40 stored in nonvolatile storage device 12. FIG. 4B shows ending history 50 stored in nonvolatile storage device 12.

As illustrated in FIG. 4A, starting history 40 includes job ID 41 identifying the job, receipt number 42 indicating order in which the job was received by image forming apparatus 10, starting time 43 indicating a time at which the job was started, executor 44 indicating an executor of the job (i.e., identification information about the executor), and destination count 45 indicating the number of destinations, if the job is a transmission job. Starting history 40 illustrated in FIG. 4A is merely an example. Starting history 40 can include not only the information described above, but also various other information.

As illustrated in FIG. 4B, ending history 50 includes job ID 51 identifying the job, job result 52 indicating a result of the job such as a normal end, an abnormal end, or a cancellation end, and ending time 53 indicating a time at which the job ended. Ending history 50 illustrated in FIG. 4B is merely an example. Ending history 50 can include not only the information described above, but also various other information.

Figure 5A:
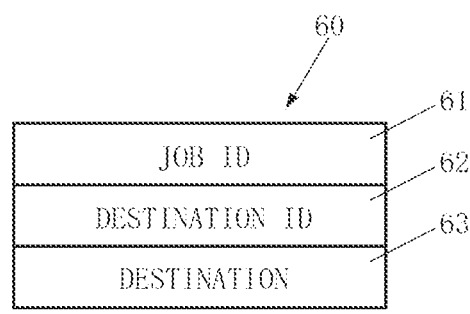
FIG. 5A shows a destination history stored in the nonvolatile storage device of the image forming apparatus.
Figure 5B:
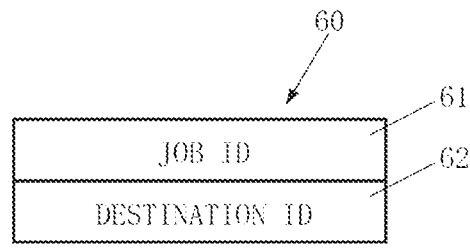
FIG. 5B shows another destination history stored in the nonvolatile storage device of the image forming apparatus.

FIGS. 5A and 5B show two different types of destination histories 60 stored in nonvolatile storage device 12.

There are two different types of destination histories 60: destination history 60 illustrated in FIG. 5A and destination history 60 illustrated in FIG. 5B. A determination of which of destination histories 60 illustrated in FIG. 5A and FIG. 5B is to be written to nonvolatile storage device 12 will be described below. Destination history 60 illustrated in FIG. 5A includes job ID 61 identifying the job, destination ID 62 identifying the destination, and destination 63 that is a character string indicating a specific destination. Since destination ID 62 is abbreviated information composed of, for example, numbers only, the storage capacity required for destination ID 62 is smaller than that for destination 63, which is the character string. Destination history 60 illustrated in FIG. 5B is information obtained by omitting destination 63 from destination history 60 illustrated in FIG. 5A. Destination histories 60 illustrated in FIG. 5A and FIG. 5B are merely examples. Destination history 60 can include not only the information described above, but also various other information.

If starting history 40, ending history 50, and destination history 60 are for the same job, then job ID 41, job ID 51, and job ID 61 are the same. In other words, job ID 41, job ID 51, and job ID 61 are identification information for associating starting history 40, ending history 50, and destination history 60 with each other.

As described above, nonvolatile storage device 12 stores address book 30 and serves as a destination registering unit of the present disclosure. Also, nonvolatile storage device 12 stores the job history including starting history 40, ending history 50, and destination history 60 and serves as a history storage unit of the present disclosure.

An operation of image forming apparatus 10 will now be described.

(Writing of Job History)

Figure 6:
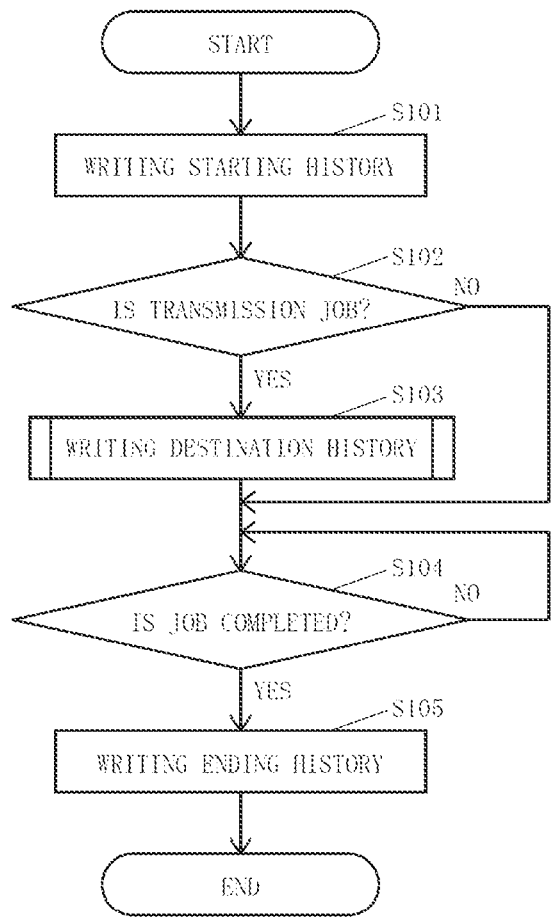
FIG. 6 shows a flowchart illustrating an operation of the control unit started by start of a job.

At the start of a job, the control unit of the image forming apparatus starts a process as shown in the flowchart of FIG. 6.

As illustrated in FIG. 6, the control unit causes the history writing unit to write the starting history to the nonvolatile storage device (step S101).

Next, the control unit determines whether the job is a transmission job (step S102).

Figure 7:
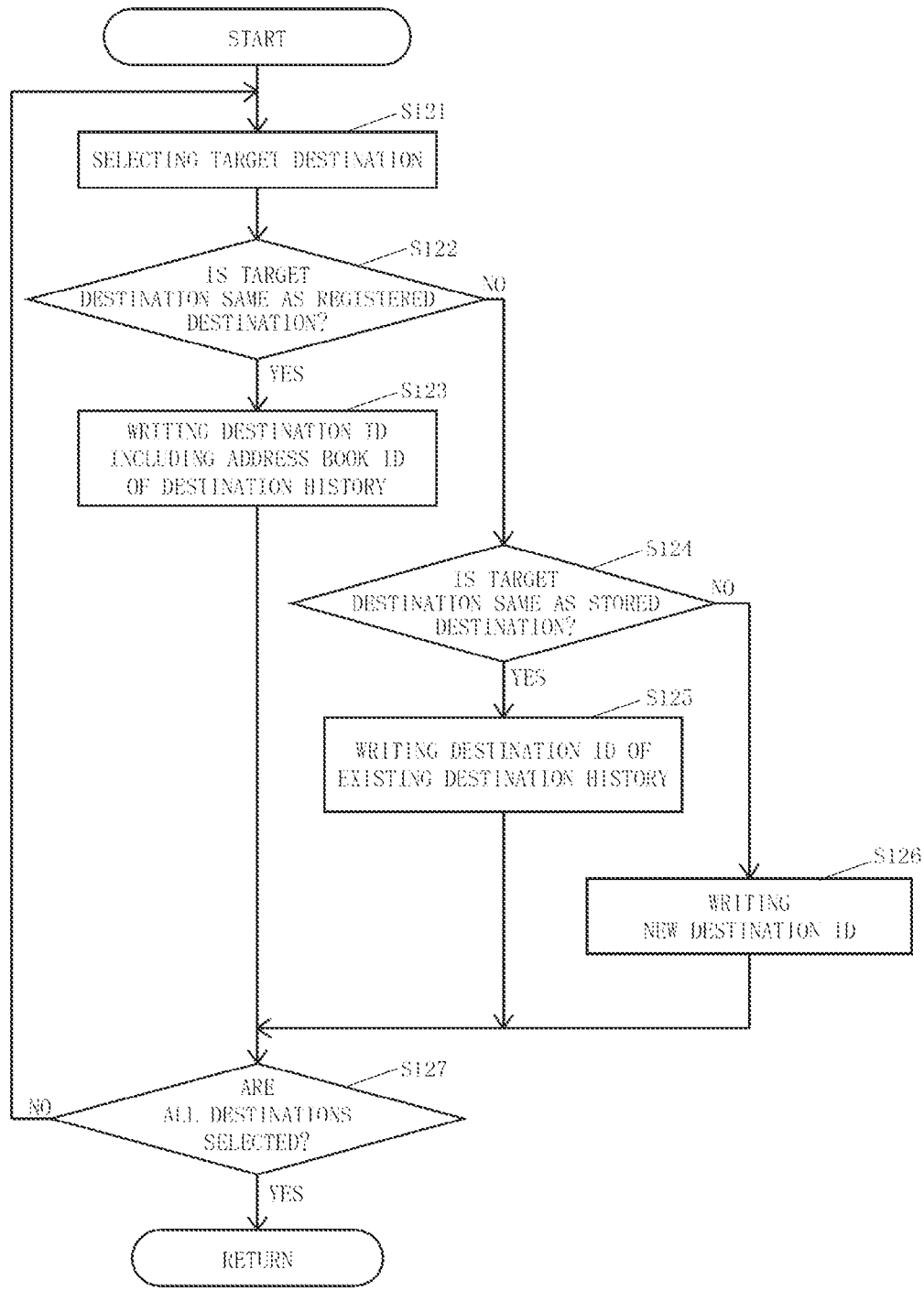
FIG. 7 shows a flowchart illustrating a destination-history writing process.

If it is determined that the job is a transmission job (YES in step S102), the control unit starts executing a destination-history writing process, as illustrated in FIG. 7 (step S103).

FIG. 7 shows a flowchart illustrating the destination-history writing process.

As illustrated in FIG. 7, the control unit selects a destination (possibly one of many) included in the job as a target destination (step S121) and determines whether the target destination is the same as the destination registered in the address book (step S122). The control unit may search the address book to determine whether the target destination is the same as the destination registered in the address book. Alternatively, if the target destination has been specifically and directly input by the user, the control unit may determine that the target destination is not the same as the destination registered in the address book. If the target destination has been input by using the address book, the control unit may determine that the target destination is the same as the destination registered in the address book.

If it is determined that the target destination is the same as the destination registered in the address book (YES in step S122), the control unit causes the history writing unit to write the destination ID in the destination history to the nonvolatile storage device (step S123). In step S123, the destination ID includes an address book ID for the destination determined to be the same as the target destination in step S122, and a communication method for the job. As described above, the address book contains destinations for various communication methods, such as the fax destination and the e-mail destination, for the same address book ID. Therefore, when the history writing unit writes the address book ID and the communication method for the job to the nonvolatile storage device, the control unit can identify the destination for a specific communication method, such as the fax destination or the e-mail destination. Note that the job ID included in the destination history written in step S123 is the same as the job ID in the starting history written in step S101.

If it is determined that the target destination is not the same as the destination registered in the address book (NO in step S122), the control unit further determines whether the target destination is the same as the destination stored in an existing destination history (step S124).

If it is determined that the target destination is the same as the destination stored in the existing destination history (YES in step S124), the control unit causes the history writing unit to write, to the nonvolatile storage device, the destination history illustrated in FIG. 5B having the destination ID identical to that included in the existing destination history in which the destination is stored (step S125). Note that the job ID included in the destination history written in step S125 is the same as the job ID in the starting history written in step S101.

If it is determined that the target destination is not the same as the destination stored in the existing destination history (NO in step S124), the control unit causes the history writing unit to write, to the nonvolatile storage device, the destination history illustrated FIG. 5A having a new destination ID as the destination ID and also having the target destination as the destination (step S126). Note that the job ID included in the destination history written in step S126 is the same as the job ID in the starting history written in step S101.

After the destination history is written to the nonvolatile storage device in step S123, S125, or S126, the control unit determines whether all destinations included in the job have been selected as the target destination (step S127).

If it is determined that not all destinations included in the job have yet been selected as the target destination (NO in step S127), the control unit performs step S121 on another destination that has not yet been selected as the target destination.

On the other hand, if it is determined that all destinations included in the job have been selected as the target destination (YES in step S127), the control unit ends execution of the destination-history writing process illustrated in FIG. 7.

As illustrated in FIG. 6, after completing the destination-history writing process in step S103, the control unit continues to determine whether the job has been completed, until it is determined that the job has been completed (step S104).

If it is determined that the job is not the transmission job (NO in step S102), the control unit executes step S104 without executing the destination-history writing process in step S103.

If it is determined that the job has been completed (YES in step S104), the control unit causes the history writing unit to write, to the nonvolatile storage device, the ending history including the job result at the end of the job (step S105), and ends the process illustrated in FIG. 6. Note that the job ID included in the ending history written in step S105 is the same as the job ID in the starting history written in step S101.

If the image forming apparatus is shut down during execution of the job (i.e., during execution of step S104 in FIG. 6), the process of FIG. 6 is terminated.

Figure 8:
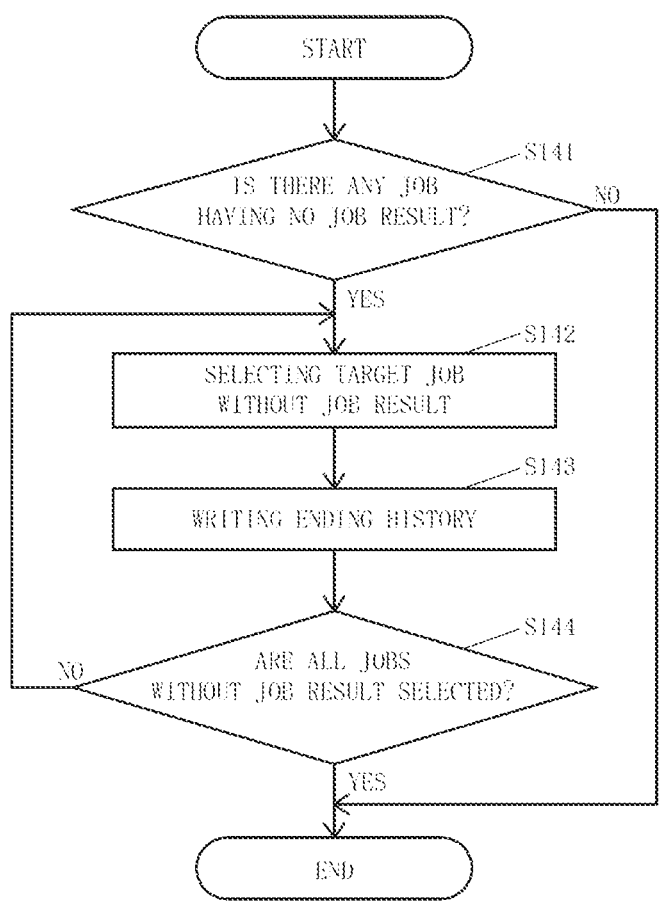
FIG. 8 shows a flowchart illustrating an operation of the control unit at startup of the image forming apparatus.

FIG. 8 shows a flowchart illustrating an operation of the control unit at startup of the image forming apparatus.

As illustrated in FIG. 8, the control unit first determines whether there is any job for which no job result is stored. That is, the control unit determines whether there is any job in which the starting history, but no ending history, has been stored, due to a power shutdown during job execution (step S141).

If it is determined that there is any job for which no job result is stored (YES in step S141), the control unit selects one of such jobs as a target job (step S142).

Next, the control unit causes the history writing unit to write the ending history for the target job to the nonvolatile storage device (step S143). The job ID included in the ending history written in step S143 is the same as the job ID included in the starting history for the target job. As the job result, a message, such as "Job terminated due to abnormal power shutdown", is written. Additionally, an ending time, such as a time of execution of step S143, is written.

Next, the control unit determines whether all jobs having no job result have been selected as the target job (step S144).

If it is determined that not all jobs having no job result have yet been selected as the target job (NO in step S144), the control unit performs step S142 on a job that has not yet been selected as the target job.

On the other hand, if it is determined that all jobs having no job result have been selected as the target job (YES in step S144), the control unit ends execution of the process illustrated in FIG. 8.

If it is determined that there is no job for which no job result has been stored (NO in step S141), the control unit ends the process of FIG. 8 without executing step S142 to step S144.

(Reading of Job History)

The job history written to the nonvolatile storage device in the above-described manner can be checked by the user. For example, in accordance with an instruction from the operation unit, the control unit causes the history reading unit to read the job history and displays the read job history on the display unit. Alternatively, in accordance with an instruction from the external apparatus via the network communication unit, the control unit causes the history reading unit to read the job history. Then, the control unit transmits the read job history via the network communication unit to the external apparatus, and displays the job history on the display unit of the external apparatus. The history reading unit can read the starting history, the ending history, and the destination history for the same job on the basis of the job ID for the starting history, the job ID for the ending history, and the job ID for the destination history. That is, if the job ID for the starting history, the job ID for the ending history, and the job ID for the destination history are the same, the history reading unit can treat the starting history, the ending history, and the destination history as the job history for the same job.

Since the ending history is written to the nonvolatile storage device after completion of the job (step S105 in FIG. 6), the job result included in the ending history has not yet been written to the nonvolatile storage device during execution of the job. Therefore, when displaying the job result, the control unit may execute a process illustrated in FIG. 9 to indicate that the job is in execution.

Figure 9:
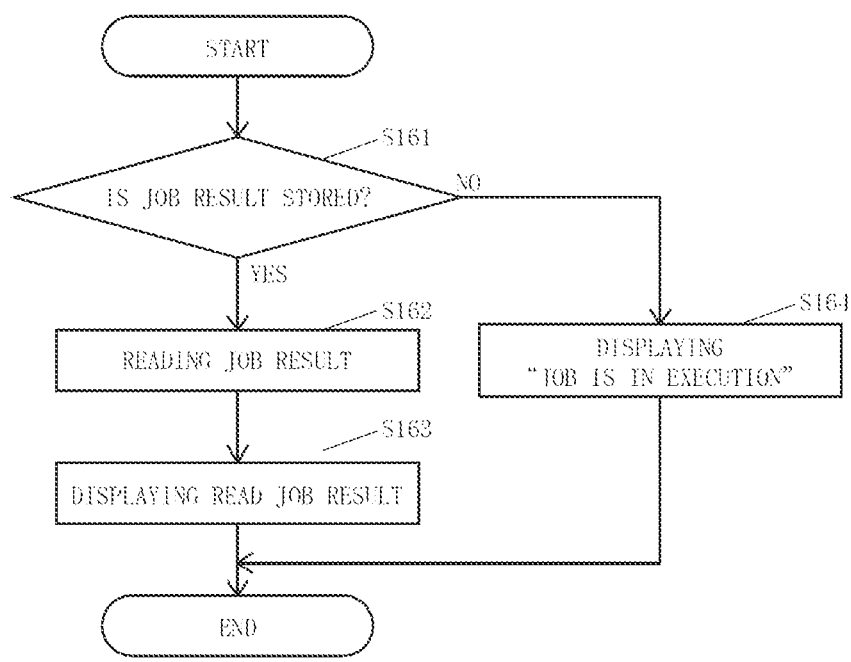
FIG. 9 shows a flowchart illustrating an operation of the control unit at the time of displaying a job result.

FIG. 9 shows a flowchart illustrating an operation of the control unit at the time of displaying the job result.

As illustrated in FIG. 9, for the job for which the job history is to be displayed, the control unit determines whether the job result is stored in the nonvolatile storage device (step S161).

If it is determined, for the job for which the job history is to be displayed, that the job result is stored in the nonvolatile storage device (YES in step S161), the control unit causes the history reading unit to read the job result stored in the nonvolatile storage device (step S162). The control unit then displays the read job result on the display unit of the image forming apparatus or the external apparatus (step S163) and ends the process of FIG. 9.

On the other hand, if it is determined, for the job for which the job history is to be displayed, that no job result is stored in the nonvolatile storage device (NO in step S161), the control unit displays a message indicating that the job is in execution on the display unit of the image forming apparatus or the external apparatus (step S164) and ends the process of FIG. 9.

(Deletion of Job History)

Job histories are deleted in chronological order (i.e., beginning with the oldest job history) under a certain condition, such as when the number of job histories reaches a specified value or when the oldest job history ages a specified period of time.

Figure 10:
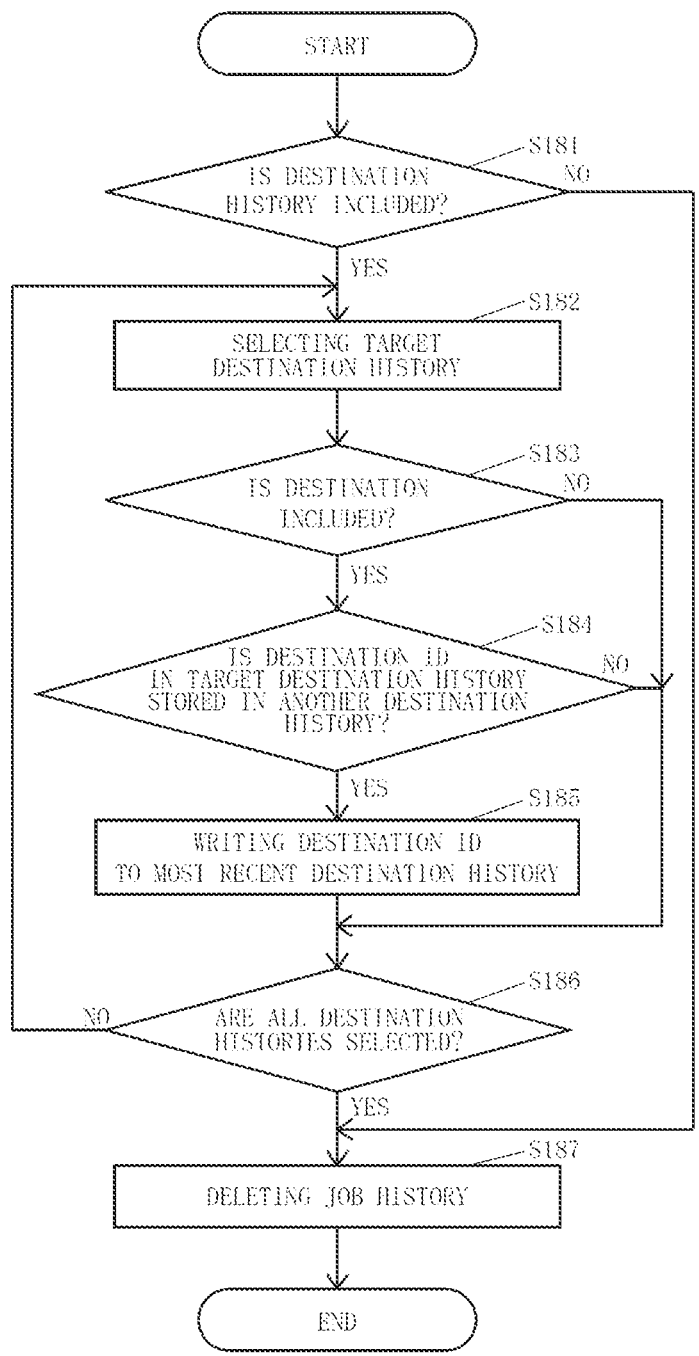
FIG. 10 shows a flowchart illustrating an operation of the control unit at the time of deleting a job history.

FIG. 10 shows a flowchart illustrating an operation of the control unit when the job history is deleted.

As illustrated in FIG. 10, the control unit determines whether the destination history is included in the job history to be deleted (step S181).

If it is determined that the destination history is included in the job history to be deleted (YES in step S181), the control unit selects one of the destination histories included in the job history to be deleted as a target destination history (step S182) and determines whether the destination is included in the target destination history (step S183).

If it is determined that the destination is included in the target destination history (YES in step S183), the control unit further determines whether the destination ID identical to that for the target destination history is stored in another destination history in the nonvolatile storage device (step S184).

If it is determined that the destination ID is stored in the other destination history in the nonvolatile storage device (YES in step S184), the control unit causes the history writing unit to write the destination to a most recent destination history (see FIG. 5B) of all destination histories in which the destination ID identical to that for which the target destination history is stored, and forms the destination history having the structure illustrated in FIG. 5A (step S185). Then, the control unit determines whether all destination histories included in the job history to be deleted have been selected as the target destination history (step S186).

If it is determined that the destination is not included in the target destination history (NO in step S183), the control unit executes step S186 without executing step S184 and step S185. If it is determined that the destination ID identical to that for the target destination history is not stored in any other destination history stored in the nonvolatile storage device (NO in step S184), the control unit executes step S186 without executing step S185.

If it is determined that not all destination histories included in the job history to be deleted have been selected as the target destination history (NO in step S186), the control unit performs step S182 on a destination history that has not yet been selected as the target destination history.

On the other hand, if it is determined that all destination histories included in the job history to be deleted have been selected as the target destination history (YES in step S186), the control unit causes the history deleting unit to delete the job history to be deleted (step S187) and ends the process illustrated in FIG. 10. If it is determined in step S181 that no destination history is included in the job history to be deleted (NO in step S181), the control unit causes the history deleting unit to delete the job history to be deleted (step S187) and ends the process illustrated in FIG. 10.

As described above, the starting history, the ending history, and the destination history are a plurality of histories obtained by dividing the job history. Each history is associated with one of the job IDs. The job IDs serve as identification information of the starting history, the ending history, and the destination history, respectively. It is not necessary that the image forming apparatus simultaneously reserve a plurality of storage areas for the starting history, the ending history, and the destination history. The image forming apparatus can create each storage area at an appropriate time. Therefore, the image forming apparatus can reduce storage capacity required for the job history.

The history writing unit categorizes information included in the job history as any of the starting history, the ending history, and the destination history depending on the time at which the information is written. Therefore, in the image forming apparatus, pieces of information (i.e., for example the receipt number, the starting time, the executor, and the destination count) included in the same history (starting history) are written at the same time, i.e., in the same write cycle. Thus, the number of writes to the starting history can be smaller than that in a configuration where the receipt number, the starting time, the executor, and the destination count are written at different times. Similarly, in the image forming apparatus, pieces of information (i.e. the job result and an ending time) included in the same history (ending history) are written at the same time. Therefore, the number of writes to the ending history can be smaller than that in a configuration where the job result and an ending time are written at different times. Thus, when the nonvolatile storage device of the image forming apparatus is, for example, a semiconductor memory, such as an EEPROM or a flash memory, whose life depends on the number of writes thereto, the life of the nonvolatile storage device can be increased.

If the starting history for the job is written, but not the job result, the image forming apparatus can determine that the job has not yet been completed; that is, the job is in execution. In other words, in the image forming apparatus, there is no need to write information (job result) indicating that the job has not yet been completed. Therefore, the number of writes to the nonvolatile storage device can be smaller than that in a configuration where information indicating that the job has not yet been completed is written as the job result. Thus, when the nonvolatile storage device of the image forming apparatus is, for example, the semiconductor memory whose life depends on the number of writes thereto, the life of the nonvolatile storage device can be increased.

For the destination history, the image forming apparatus reserves a storage area having a size appropriate for the number of destinations. Thus, the storage capacity required for the job history can be reduced, compared to a configuration where it is necessary to always reserve a large storage area of constant size for the history that stores destinations.

If the destination is already stored in the destination history on the nonvolatile storage device, the image forming apparatus can write the destination ID instead of the destination. Thus, as compared to a configuration where the destination is written, the storage capacity required for the job history can be reduced.

If the destination is already registered in an address book on the nonvolatile storage device, the image forming apparatus can write the destination ID instead of the destination. Thus, as compared to a configuration where the destination is written, the storage capacity required for the job history can be reduced.

When the destination history including the destination is to be deleted, the image forming apparatus creates the new destination history including the destination. Thus, even when the destination history including the destination is deleted, the destination can be read on the basis of the destination ID.

Job histories are often deleted in chronological order, beginning with the oldest job history. When deleting the destination history including the destination, the image forming apparatus adds the destination to the most recent destination history of all destination histories including the destination ID identical to that for the destination history to be deleted. Thus, the number of times the destination history including the destination is deleted can be smaller than that in a configuration where the destination is added to the destination history that is not the most recent destination history. This means that the number of times the destination is added to the destination history can be reduced. Therefore, when the nonvolatile storage device of the image forming apparatus is the semiconductor memory whose life depends on the number of writes thereto, the life of the nonvolatile storage device can be increased. Note, however, that the image forming apparatus may be configured to add the destination to the destination history that is not the most recent destination history of all destination histories including the destination ID identical to that for the destination history to be deleted.

When writing, reading, and deleting job histories, the image forming apparatus may deal with job histories for each user. For example, when writing the job history, the image forming apparatus may use, as targets of determination in step S124 of FIG. 7, only destination histories for jobs executed by an executor of the job on which the job history to be written is based. Similarly, when deleting the job history, the image forming apparatus may use, as targets of determination in step S184 of FIG. 10, only destination histories for jobs executed by an executor of the job on which the job history to be deleted is based.

The image forming apparatus of the present disclosure is applicable to copiers, printers, facsimile apparatuses, and multifunction peripherals that combine their capabilities.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. An image forming apparatus comprising:
a history storage unit configured to store a job history that shows a history of a job;
a history writing unit configured to divide the job history for the job into a plurality of histories, add identification information to the plurality of histories for associating the plurality of histories with each other, and write the plurality of histories to the history storage unit;
a history reading unit configured to read the plurality of histories for the job on the basis of the identification information; and
a history deleting unit configured to delete the job history from the history storage unit, wherein
if the job is a transmission job for transmitting data to a destination and if the destination is already stored in the history storage unit, the history writing unit is configured to include destination identification information for identifying the destination in the job history and write the job history; and
when the history deleting unit deletes the job history including the destination, the history writing unit is configured to add the destination to a most recent job history of all job histories including the destination identification information.

2. The image forming apparatus according to claim 1, wherein, for each history composing one of the plurality of histories in the job history, the history writing unit is configured to write, in a single write cycle, all pieces of relevant information corresponding to that history.

3. The image forming apparatus according to claim 1, wherein
the plurality of histories include a starting history written at a start of the job and an ending history written at an end of the job; and
the history writing unit is configured to include a result of the job in the ending history.

4. The image forming apparatus according to claim 1, wherein
if the job is a transmission job for transmitting data to a plurality of destinations, the history writing unit is configured to divide the plurality of destinations into different ones of the plurality of histories and write the plurality of histories to the history storage unit.

5. The image forming apparatus according to claim 1 further comprising a destination registering unit configured to register at least a destination used for transmitting the job,
wherein the job is a transmission job for transmitting data to the destination.

6. A non-transitory computer-readable recording medium that stores job history management program code to be executed by a computer of an image forming apparatus, the job history management program code comprising:

first sub program code for causing the computer to divide a job history for a job into a plurality of histories, add identification information to the plurality of histories for associating the plurality of histories with each other, and write the plurality of histories to a history storage unit;

second sub program code for causing the computer to read the plurality of histories for the job on the basis of the identification information; and third sub program code for causing the computer to delete the job history from the history storage unit, wherein if the job is a transmission job for transmitting data to a destination and if the destination is ready stored in the history storage unit, the first sub program code causes the computer to include destination identification information for identifying the destination in the job history and write the job history; and when the job history including the destination is deleted under the third sub program code, the first sub program code causes the computer to add the destination to a most recent job history of all job histories including the destination identification information.

7. The non-transitory computer-readable recording medium according to claim 6, wherein for each history composing one of the plurality of histories in the job history, the first sub program code causes the computer to write, in a single write cycle, all pieces of relevant information corresponding to that history.

8. The non-transitory computer-readable recording medium according to claim 6, wherein the plurality of histories include a starting history written at a start of the job and an ending history written at an end of the job; and the first sub program code causes the computer to include a result of the job in the ending history.

9. The non-transitory computer-readable recording medium according to claim 6, wherein if the job is a transmission job for transmitting data to a plurality of destinations, the first sub program code causes the computer to divide the plurality of destinations into different ones of the plurality of histories and write the plurality of histories to the history storage unit.

10. A job history management method for a job history in an image forming apparatus comprising:

dividing, in a history writing unit, a job history for a job into a plurality of histories, adding identification information to the plurality of histories for associating the plurality of histories with each other, and writing the plurality of histories to a history storage unit;

reading, in a history reading unit, the plurality of histories for the same job on the basis of the identification information; and deleting, in a history deleting unit, the job history from the history storage unit, wherein if the job is a transmission job for transmitting data to a destination and if the destination is already stored in the history storage unit, the history writing unit includes destination identification information for identifying the destination in the job history and write the job history; and when the history deleting unit deletes the job history including the destination, the history writing unit adds the destination to a most recent job history of all job histories including the destination identification information.

11. The job history management method according to claim 10, wherein for each history composing one of the plurality of histories in the job history, the history writing unit writes, in a single write cycle, all pieces of relevant information corresponding to that history.

12. The job history management method according to claim 10, wherein the plurality of histories include a starting history written at a start of the job and an ending history written at an end of the job; and the history writing unit includes a result of the job in the ending history.

13. The job history managing method according to claim 10, wherein if the job is a transmission job for transmitting data to a plurality of destinations, the history writing unit divides the plurality of destinations into different ones of the plurality of histories and writes the plurality of histories to the history storage unit.

* * * * *